March 19, 1935.  H. K. DAVIS  1,995,170
BALL DRIVING MACHINE
Filed Feb. 14, 1934   2 Sheets-Sheet 1
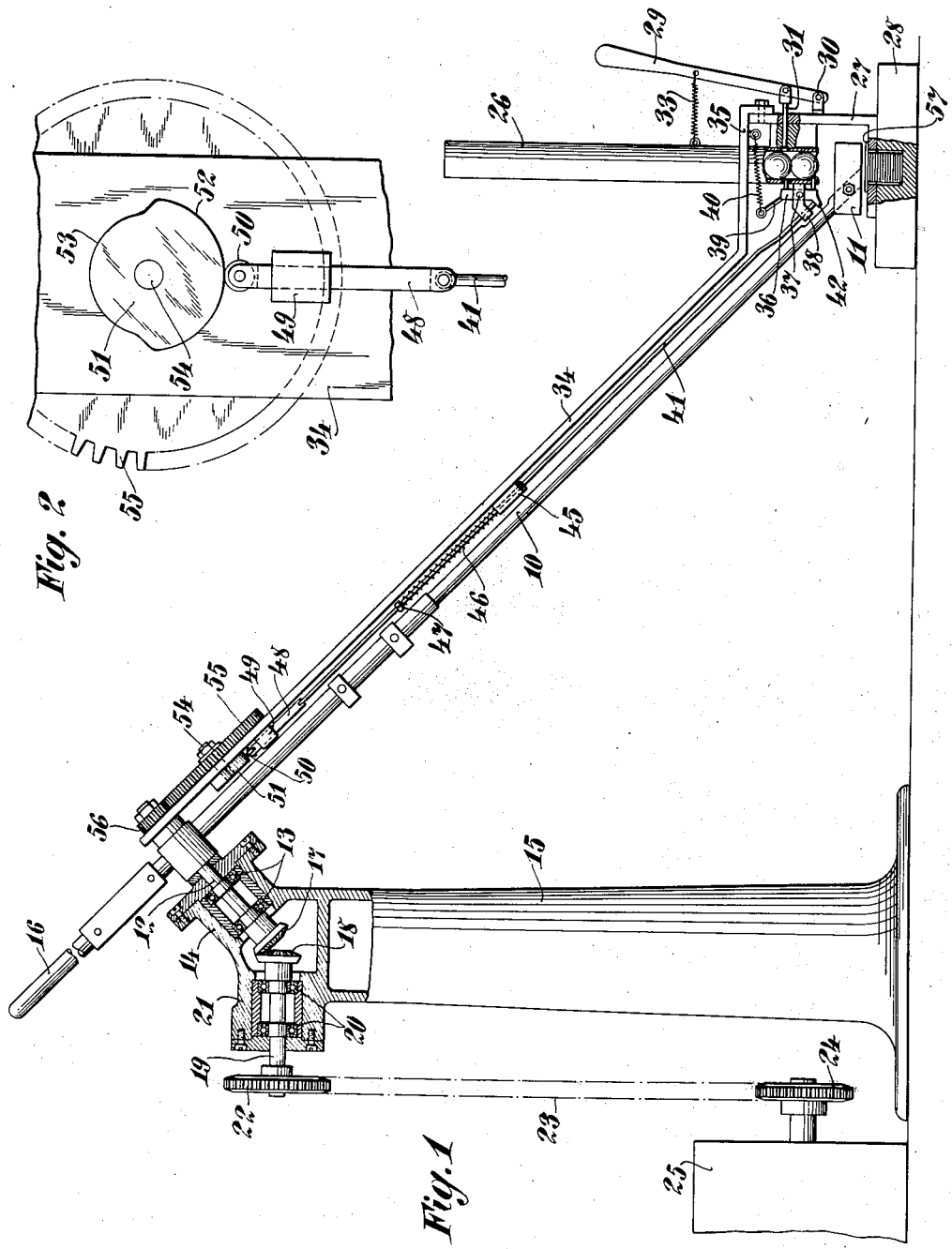
INVENTOR:
Henry K. Davis,
BY
Redding, Greeley, O'Shea & Campbell
HIS ATTORNEYS March 19, 1935.  H. K. DAVIS  1,995,170
BALL DRIVING MACHINE
Filed Feb. 14, 1934   2 Sheets-Sheet 2
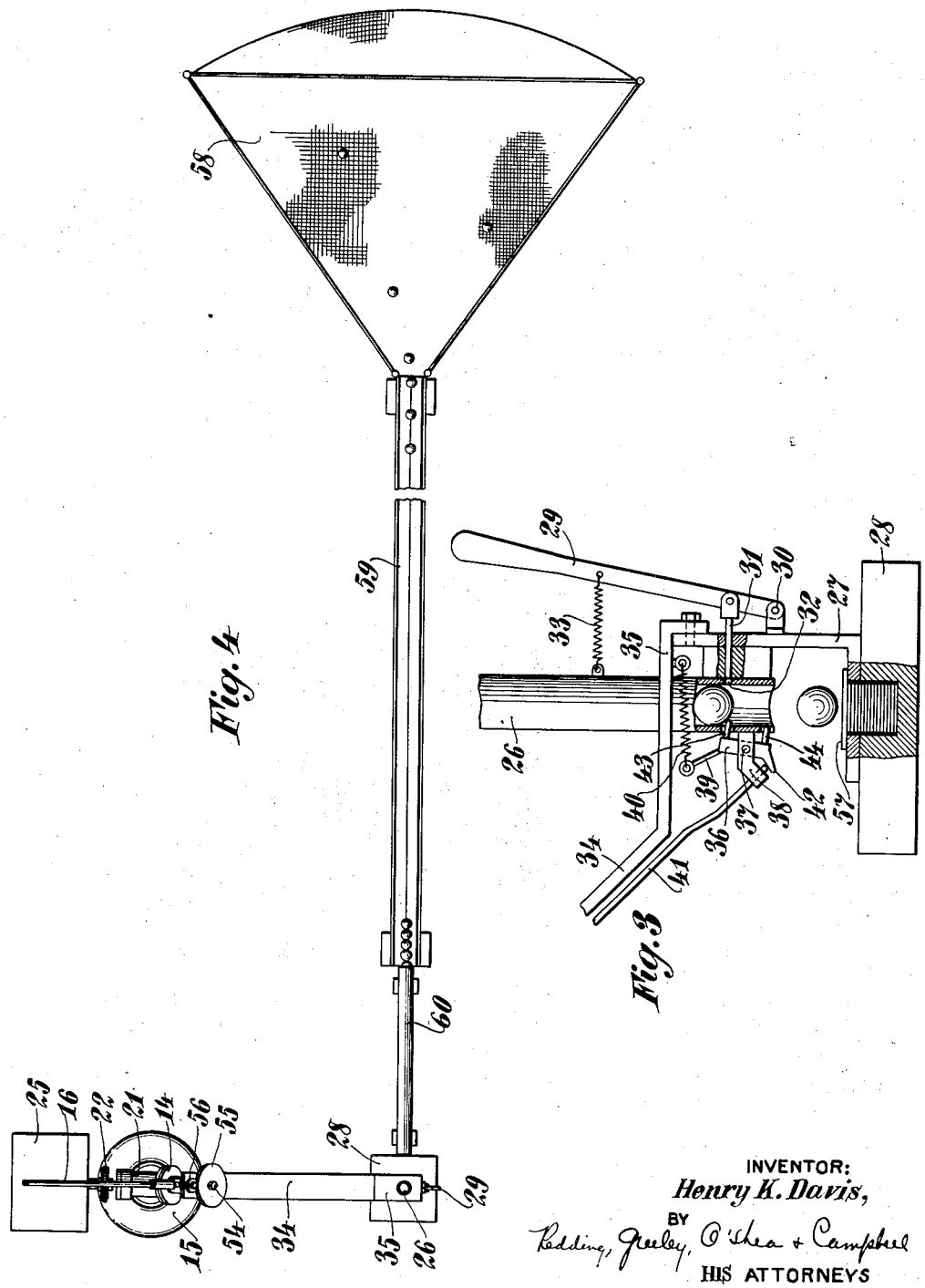
INVENTOR:
*Henry K. Davis,*
BY
Redding, Greeley, O'Shea & Campbell
HIS ATTORNEYS

Patented Mar. 19, 1935

1,995,170

UNITED STATES PATENT OFFICE 1,995,170

BALL DRIVING MACHINE

Henry K. Davis, New York, N. Y., assignor to A. G. Spalding & Bros., New York, N. Y., a corporation of New Jersey Application February 14, 1934, Serial No. 711,116

5 Claims. (Cl. 73—51)

The present invention relates to driving machines and embodies, more specifically, an improved ball driving machine by means of which golf balls may be effectively subjected to driving stresses and conditions.

More particularly, the invention embodies a ball driving machine by means of which a plurality of balls may be driven automatically and with a desired rapidity, whereby their trajectories may be accurately studied. In this connection, the mechanism is designed to synchronize the motion of the ball prior to striking and the motion of the striking implement in such fashion that the rapidity with which successive balls are driven may be varied within predetermined limits.

An object of the invention, accordingly, is to provide a ball driving machine by means of which a plurality of balls may be automatically supplied to a driving member in order that the balls may be driven successively and automatically.

A further object of the invention is to provide a ball driving machine wherein a plurality of balls are supplied to a driving member, means being provided to synchronize the motion of the balls with that of the driving member.

A further object of the invention is to provide a driving machine of the above character wherein the means for supplying balls to the driving member comprises a means whereby the balls are caused to bounce and be struck by the driving member at a predetermined point of rebound.

A further object of the invention is to provide a ball driving member of the above character wherein the ball supplying means and the driving member are so constructed as to utilize the gravitational action of a freely falling body to produce a rebound of the ball in such fashion that the driving member strikes the ball at a predetermined point of the rebound.

The foregoing and other objects of the invention will be apparent as it is described in further detail in connection with the accompanying drawings, wherein:

Figure 1 is a view in side elevation, partly broken away and in section, showing a driving mechanism constructed in accordance with the present invention, the portions in section illustrating the driving mechanism as well as the ball supplying device.

Figure 2 is a detail enlarged view of the cam mechanism by means of which the ball supplying means is synchronized with the driving member.

Figure 3 is an enlarged detail view of the ball supplying means, this view being similar to Figure 1, but showing the mechanism in the positon assumed thereby upon release of a ball therefrom.

Figure 4 is a plan view of the mechanism shown in Figure 1, this view showing a net and collecting device which may be used in connection with the present invention.

Referring to the above drawings, a driving arm is shown at 10 and is provided with a driving head 11, the arm being mounted upon a shaft 12 which is journaled at 13 in a hollow extension 14 of a supporting standard 15. The shaft 12 is preferably journaled upon an axis which lies at an angle between the horizontal and vertical and is provided with a counterweight 16 to counterbalance the rotating driving member 10.

The end of shaft 12 within the standard 15 is provided with a bevel gear 17 which is adapted to engage a cooperating bevel gear 18 mounted upon a horizontal shaft 19. Shaft 19 is journaled at 20 in a horizontal extension 21 on the standard 15 and is provided with a driving gear 22 which may be driven by the chain 23 (indicated in dot and dash lines in Figure 1) or by any other suitable mechanism. Chain 23 is shown as being driven by a sprocket gear 24 and a driving member 25. This driving mechanism is preferably of any suitable variable speed type and need not be described in further detail herein, the requisites thereof being only those of a driving member preferably embodying variable speed characteristics.

In order that balls may be supplied to the driving head 11, as it revolves about the axis of shaft 12, a ball magazine 26 is provided, mounted upon a bracket 27 which may be secured to a base plate 28 and provided with a starting lever 29 journaled at 30 to the bracket 27. The starting lever 29 is provided with a stop pin 31 which is adapted to be moved into the magazine through an aperture 32 formed therein and to lie in the path of balls in the magazine. A spring 33 normally urges the lever 29 toward the magazine and consequently serves to urge the pin 31 into the path of the balls within the magazine to prevent their being discharged. The base plate 28 is preferably mounted rigidly with the standard 15 in order that the proper spacing between the elements may be preserved. A brace bar 34 is formed with a lower horizontal portion 35 which is secured to the bracket 27 and may serve to maintain the space relation between the standard 15 and the magazine 26. The upper end of plate 34 engages shaft 12, the latter being journaled within the upper end thereof.

The discharge of balls from the magazine is controlled by a trip lever 36 which is pivoted at 37 upon a bracket 38 which is carried by the lower end of the magazine 26. An arm 39 is formed on the lever 36, a spring 40 being secured between the arm 39 and the extension 35 of the plate 34 in order that the trip lever 36 may be normally urged into the position illustrated in Figure 3. A push rod 41 is slidably mounted in the bracket 38 and is adapted to engage a shoulder 42 which is formed on the trip lever 36. The motion of the push rod 41 toward the bracket 38 causes the trip lever to swing in a counterclockwise direction as viewed in Figures 1 and 3 and, by means of upper and lower trip pins 43 and 44, respectively, fixed on the lever 26, the release of one ball at a time from the magazine is effected. In the position illustrated in Figure 1, the lower trip pin 44 is moved into the path of the balls while the upper trip pin is withdrawn from the magazine thus permitting a ball to drop down upon the lower trip pin. Such action is effected by motion of the push rod 41 toward the bracket 38. A reverse motion of the rod 41 enables the spring 40 to move the upper trip pin 43 into the position shown in Figure 3, simultaneously withdrawing the lower pin 44 from the magazine and permitting the lowest ball to be dropped while maintaining the remaining balls in the magazine as shown in Figure 3.

In order that the motion of the push rod 41 may be effectively controlled, the bar 34 is provided with a member 45 within which the push rod is guided. A spring 46 interposed between the member 45 and a collar 47 upon the push rod urges the rod normally upwardly and away from the shoulder 42. The upper end of the rod is connected to a bar 48 which is slidably mounted in a supporting block 49, secured to the bar 34. Bar 48 is formed with a bifurcated portion at the upper end thereof in which a roller 50 is journaled. Roller 50 engages the periphery of a cam disc 51, the disc having a high side 52 and a low side 53. This cam disc is secured to a shaft 54 which is journaled in the plate 34 and to which a driving gear 55 is secured. Driving gear 55 is engaged by a pinion 56 which is secured to the shaft 12, the gear ratio between the pinion 56 and gear 55 being such as to afford a desired synchronization of the motion of the driving arm 10 and the tripping mechanism on the magazine 26. In the particular form now in use this gear ratio is four to one and the cam disc is formed with a high and low side each of 180°. As a result, the tripping mechanism is actuated once in every four revolutions of the driving arm, such actuation releasing a ball from the magazine 26 and permitting the ball to drop upon an anvil 57 formed of a substance to provide a suitable surface on which the ball when dropped from above will bounce properly. In the machine now in use, the anvil is formed of canvas discs.

The device, if desired, may be used in combination with a net and collecting device as shown in Figure 4. The driving machine is adjusted to drive balls into a net 58 from which the balls are collected and returned through a trough 59 to a magazine 60. The balls so collected may be introduced into the magazine 26 and, in this fashion, the balls may be conveniently subjected to desired tests.

In operation, the arm 10 may be set in motion, rotating about the axis of shaft 12 and balls placed in the magazine 26. When it is desired to cause the striking head 11 to strike balls from the magazine, the lever 29 is released and the trip pin 43 allowed to sustain the weight of the balls in the magazine, this pin preventing the release of the balls therefrom. During the period of rotation of the head 11 in which the low side 53 of the cam 51 engages the roller 50, the pin 43 holds the balls within the magazine. When the roller 50 rides up on to the high side 52 of the cam, the push rod 41 is moved axially to rock the tripping lever 36 in a counterclockwise direction and move the pin 44 into the magazine at the same time withdrawing pin 43 therefrom. This causes the balls within the magazine 26 to descend and be supported by the pin 44. When the roller 50 rides from the high to the low side of the cam 51, the pin 44 is withdrawn and the lowest ball permitted to drop on to the bouncing surface 57 as illustrated in Figure 3. Upon release of the pin 44, the pin 43 advances into the path of the balls in the magazine 26 and thus prevents more than one ball from being released at a time. In this fashion, the machine is adjusted to deliver a ball into striking position once every fourth revolution of the striking head 11. The striking and ball supplying means are effectively maintained in proper relative position by means of the bar 34 which, in the form of the invention now in use, serves as a mounting means for the gears 55 and 56, for the cam and push rod mechanism for actuating the tripping lever of the ball supplying means. By mounting the striking means for rotation in a plane at an angle between the horizontal and vertical, the ball supplying means may be of such character as to drop the balls under the action of gravity and cause the same to be bounced into a striking position, the striking head 11 being timed to strike the balls on the first rebound thereof from the canvas surface 57. By varying the speed of the striking head 11 and the loft angle thereof, the length of drive may be varied. In the construction shown and described herein, for a given loft angle of the club or striking head, a drive of from 200 to 220 yards results with a speed of operation such that a ball may be driven every eight tenths of a second. In this fashion, several balls are in flight at one time and the trajectories thereof may thus be conveniently studied and compared under similar air and other conditions.

The invention obviously may be embodied in structures differing in form and arrangement from the structure described specifically hereinabove and it will be apparent that the ball feed mechanism may include a magazine or magazines in positions other than the vertical position. Moreover, the striking mechanism and timing mechanism may be varied substantially to include many devices wherein a suitable automatic operation is effected in releasing and supplying balls to a driving implement. The scope of the invention thus is not to be limited, save as defined in the appended claims.

I claim as my invention:

1. A striking device comprising a rotatable striking means, means to mount the striking means for rotation in a plane at an angle to the horizontal and vertical, means to supply balls in a vertical plane, said ball supplying means lying in a plane intersecting the path of movement of the striking means and adapted, when actuated, to drop a ball, a bouncing surface from which the ball may bounce into a striking position in the path of the striking means, and means operated by the striking means to actuate the supplying means.

2. A striking device comprising a rotatable striking means, means to mount the striking means for rotation in a plane at an angle to the horizontal and vertical, means to supply balls in a vertical plane, said ball supplying means lying in a plane intersecting the path of movement of the striking means and adapted, when actuated, to drop a ball, a bouncing surface from which the ball may bounce into a striking position in the path of the striking means, tripping means on the supplying means to release a ball therefrom, and means operated by the striking means to actuate the tripping means.

3. In combination with means forming a bouncing surface and ball releasing means spaced thereabove, a striking means movable between the releasing means and the bouncing surface, and means actuated by the striking means to operate the releasing means.

4. In combination with means forming a bouncing surface and ball releasing means spaced thereabove, a striking means movable between the releasing means and the bouncing surface in a plane at an angle to the vertical and horizontal, and means actuated by the striking means to operate the releasing means.

5. In combination with means forming a bouncing surface and ball releasing means spaced thereabove, a striking means movable between the releasing means and the bouncing surface, and means actuated by the striking means to cause the releasing means to release one ball at a time.

HENRY K. DAVIS.